(78.)
GEORGE E. HOPKINS & WILLIAM B. SHEDD.
Improvement in Machines for preparing Sisal Grass and like Substances.
No. 4,671. Reissued Dec. 12, 1871.
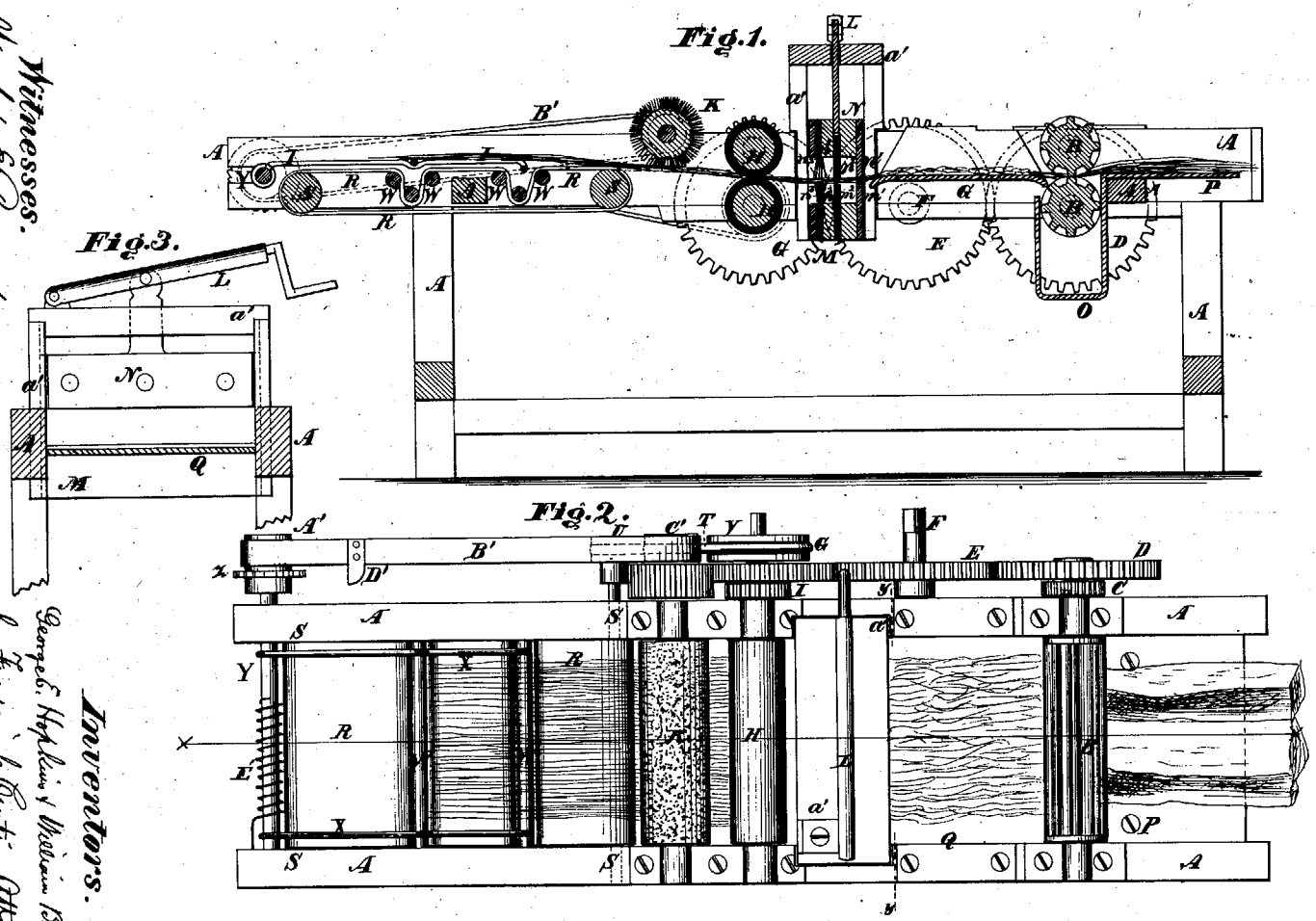
*Witnesses.*
Waldo E. Boardman.
Gardner C. Hawkins
*Inventors.*
George E. Hopkins & William B. Shedd
by Frederick Curtis Attorney.

UNITED STATES PATENT OFFICE.

GEORGE E. HOPKINS AND WILLIAM B. SHEDD, OF BOSTON, MASSACHUSETTS.

IMPROVEMENT IN MACHINES FOR PREPARING SISAL GRASS AND LIKE SUBSTANCES.

Specification forming part of Letters Patent No. 110,237, dated December 20, 1870; reissue No. 4,671, dated December 12, 1871.

*To all whom it may concern:*

Be it known that we, GEORGE E. HOPKINS and WILLIAM B. SHEDD, of Boston, in the county of Suffolk and State of Massachusetts, have invented a new and useful Improvement in Sisal-Grass Machine; and we do hereby declare that the following is a full, clear, and exact description thereof, which will enable others skilled in the art to make and use the same, reference being had to the accompanying drawing forming part of this specification.

Figure 1 is a vertical longitudinal section of our improved machine taken through the line X X, Fig. 2. Fig. 2 is a top view of the same. Fig. 3 is a vertical cross-section of the same taken through the line Y Y, Fig. 2.

Similar letters of reference indicate corresponding parts.

Our invention has for its object to furnish a simple, convenient, and effective machine for crushing, scraping, and cleaning the leaves or stalks of the "*agave Americana*" or American aloe, better known as Sisal grass or Sisal hemp, and for cleaning the "reah" or China grass and other fibrous leaves, and which shall be so constructed as to clean the fiber perfectly and lay it straight, ready for baling; and it consists in the construction and combination of the various parts of the machine, as hereinafter more fully described.

A is the frame of the machine, to which, near its rear end, are pivoted two grooved or fluted rollers, B, placed the one directly above the other, and geared to each other by gear-wheels C. To one of the journals of the grooved rollers B is attached a gear-wheel D, the teeth of which mesh into the teeth of the gear-wheel E attached to the shaft F, which works in bearings attached to the frame A, and with which the driving-power may be connected in the ordinary manner. The teeth of the gear-wheel E mesh into the teeth of the gear-wheel G attached to the journal of one of the rubber rollers H, which are placed one above the other, and are geared to each other by the gear-wheels I. The teeth of the gear-wheel G mesh into the teeth of the gear-wheel J attached to the journal of the cylindrical brush K, which is placed a little distance from the rubber rollers H, and the brush of which is made of wire or other suitable material. M is the stationary scraper, which is securely attached to the frame A, and which consists of one or more scrapers, $m^1$, made of steel, iron, wood, or other suitable material, one or more rubber plates or scrapers, $m^2$, and one or more brushes, $m^3$, made of wire or other suitable material. N $n^1$ $n^2$ $n^3$ is the movable scraper, made exactly like the scraper M, except that it is movable and works up and down in the frame $a'$ attached to the frame A as it is moved by the lever L, which is pivoted to the frame of the scraper N, which arm passes up through a slot in the cross-bar of the frame $a'$. One end of the lever L is pivoted to the cross-bar of the frame $a'$, and its other end extends out into such a position that it may be conveniently reached and operated by the attendant to raise and lower the scraper N, as required. O is a trough placed beneath the crushing-rollers B to receive the saccharine matter expressed by the rollers while crushing the leaves. P is a stationary apron attached to the frame A in the rear of the rollers B, and from which the leaves or stalks are fed to said rollers. As the crushed leaves and stalks pass from the rollers B they pass along the apron Q, attached to the frame A and extending from the rollers B, to the scrapers M N, and pass over the stationary scraper M, the movable scraper N being raised, and are grasped by the rubber rollers H. As soon as the ends of the fibers are grasped by the rollers H the movable scraper N is lowered, so that the fiber will be scraped and cleaned as it is being drawn by the rubber rollers H between the scrapers M N. As the end parts of the fiber which were not acted upon by the scrapers M N pass out from the rollers H they are cleaned by the revolving brush K. From the rollers H and revolving brush K the cleaned fibers pass to the endless apron R, by which they are carried to the front of the machine. The apron R passes around rollers S pivoted to the frame A and driven by the band T, which passes around a pulley, U, attached to one of said rollers S, and around a pulley, V, attached to the journal of one of the rubber rollers H. The upper part of the endless apron R passes around guide-rods or rollers W attached to the frame A to form recesses in the said upper part of said apron to receive the cross-bars of the rack or frame X, the side bars of which extend along the side bars of the frame A, so that the fibers may pass over the frame X as they are carried forward by the endless apron R. The outer or forward end of the frame X is attached to the shaft Y that revolves in bearings in the forward ends of the side bars of the frame A, and to its outer end is attached a ratchet-wheel Z and a pulley, A′. B′ is a band, which passes around the pulley A′ and around a pulley. C′, attached to the end of the journal of the revolving brush K. To the band B′ is attached a pawl, D′, which, at each revolution of the band B′, takes hold of the ratchet-wheel Z and partially revolves the shaft Y, which carries the frame X with it, depositing the cleaned fibers upon the floor in a straight heap ready for baling. When the ratchet-wheel Z is released by the pawl D′ the shaft Y is revolved back, bringing the frame X to its former position upon the endless apron R by the spring E′ coiled around the shaft Y and connected with the said shaft and with the frame A.

Having thus described our invention, we claim as new and desire to secure by Letters Patent—

1. In machinery for crushing, scraping, and cleaning the leaves and stalks of fibrous plants, the combination, with rolls for crushing and expressing liquid or semi-liquid matter from the plant, of scrapers for separating the pulp or pith from the fiber, and drag-rollers for drawing the plant through said scrapers, substantially as herein shown and described.

2. In machinery such as specified, the combination of the scrapers which separate the pulp or pith of the plant from the fiber with drag-rollers to draw the plant through said scrapers, substantially as herein shown and set forth.

3. The movable scraper N and stationary scraper M, constructed and operating in connection with each other, substantially as herein shown and described, to clean the fibers as the crushed leaves or stalks are drawn between then.

4. The combination of the crushing-rollers B, scrapers M N, rubber rollers H, and revolving brush K with each other and with the frame A, substantially as herein shown and described, and for the purpose set forth.

5. The combination of the endless apron R with the revolving brush K, rubber rollers H, scrapers M N, and crushing-rollers B, substantially as herein shown and described, and for the purpose set forth.

6. The combination of the rack or frame X, spring E′, shaft Y, ratchet-wheel Z, and pawl D′ with the band B′ and endless apron R, substantially as herein shown and described, and for the purpose set forth.

G. E. HOPKINS.
WM. B. SHEDD.

Witnesses:
EDW. GRIFFITH,
WALDO E. BOARDMAN.

(78)